United States Patent [19]
Asano et al.

[11] Patent Number: 5,953,382
[45] Date of Patent: *Sep. 14, 1999

[54] CDMA SYSTEM MOBILE COMMUNICATION RECEIVER

[76] Inventors: Nobuo Asano, 31 Duncan Way, Freehold, N.J. 07728; Yoshiharu Osaki, Hoshikawa 1-1-501, Hydogaya-Ku, Yokohama 240, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/680,686

[22] Filed: Jul. 17, 1996

[51] Int. Cl.$^6$ ................................. H04B 7/10; H04L 1/02

[52] U.S. Cl. ........................... 375/347; 375/200; 370/342

[58] Field of Search ...................................... 375/200, 206, 375/267, 324, 347, 349, 354; 455/101, 38.1, 513, 62, 63, 296, 67.1; 370/335, 342, 320, 441

[56] References Cited

U.S. PATENT DOCUMENTS

| | | | |
|---|---|---|---|
| 5,361,276 | 11/1994 | Subramanian | 375/346 |
| 5,448,600 | 9/1995 | Lucas | 375/200 |
| 5,671,221 | 9/1997 | Yang | 370/320 |

*Primary Examiner*—Chi H. Pham
*Assistant Examiner*—Jean B Corrielus
*Attorney, Agent, or Firm*—Amster, Rothstein & Eberstein

[57] ABSTRACT

A demodulator for a cellular communications receiver system is disclosed which preferentially selects for concurrent demodulation the transmissions which originate from different base stations. The cellular receiver system selects a group of transmissions having the highest reception energies at each reception timing and preferentially assigns those transmissions to be demodulated. The receiver is also equipped to select a second group of transmissions having reception energies other than the highest at each reception timing. The receiver is provided with a priority one table and a priority two table for storing records of the reception energy and reception timing for each respective group of transmissions.

20 Claims, 7 Drawing Sheets

—————— Multipath profile of sector a
—·—·—·— Multipath profile of sector b
·············· Multipath profile of sector e

CDMA SYSTEM MOBILE COMMUNICATION RECEIVER

The present invention relates to a spread spectrum mobile communication receiver and more specifically to a system and method for providing improved reception by a mobile communication receiver while communicating in an area near the boundary between different transmission zones.

FIELD OF THE INVENTION

In recent years, attention has been paid to digital mobile communications systems which implement Code Division Multiple Access (CDMA) transmission. In the United States, a standard has been adopted for CDMA transmission by the Telecommunications Industry Association (TIA). The specifications and operating principles of that standard have been summarized in "Mobile Station-Base Station Compatibility Standard for Dual Mode Wideband Spread Spectrum Digital Cellular System" (IS-95) (hereinafter, the "CDMA Standard").

In accordance with the CDMA Standard, information signals are transmitted by zone area transmitters on code division multiplexed channels which occupy the same transmission frequencies by modulating the information signals with a periodic 32 kilobit spread code. Each zone area transmitter, i.e., base station or sector transmitter, modulates the information signal at a different phase (a different record point) of the spread code, to permit the multiplexed signals to be distinguished from each other by corresponding demodulation at the receiver. Each individual zone area transmitter further multiplexes the modulated information signals for transmission to particular mobile stations by modulating them according to orthogonal Walsh codes, of which sixty-four are provided under the CDMA Standard.

Spread spectrum modulation according to the above-described CDMA Standard results in the multiplexing of signals according to spread code phases which have extremely small cross-correlation with each other. At the same time, the spread code modulated signals have sharp auto-correlation characteristics. As a result, spread spectrum modulation according to the CDMA Standard permits a large quantity of voice and data channels to be multiplexed within a given unit of bandwidth while providing improved resolution performance for each multiplexed channel.

BRIEF DESCRIPTION OF THE FIGURES

The background of the prior art and this invention can best be understood by reference to the accompanying Figures whose depictions are as follows.

BACKGROUND OF THE INVENTION

In receivers which operate according to the CDMA Standard, the signal-to-noise ratio can be improved for the demodulation process by separately demodulating a plurality of multipath components of the transmission signal according to their respective reception timings. The separately demodulated multipath components are then combined as a weighted sum to produce a maximal-ratio combined signal.

Figure 1:
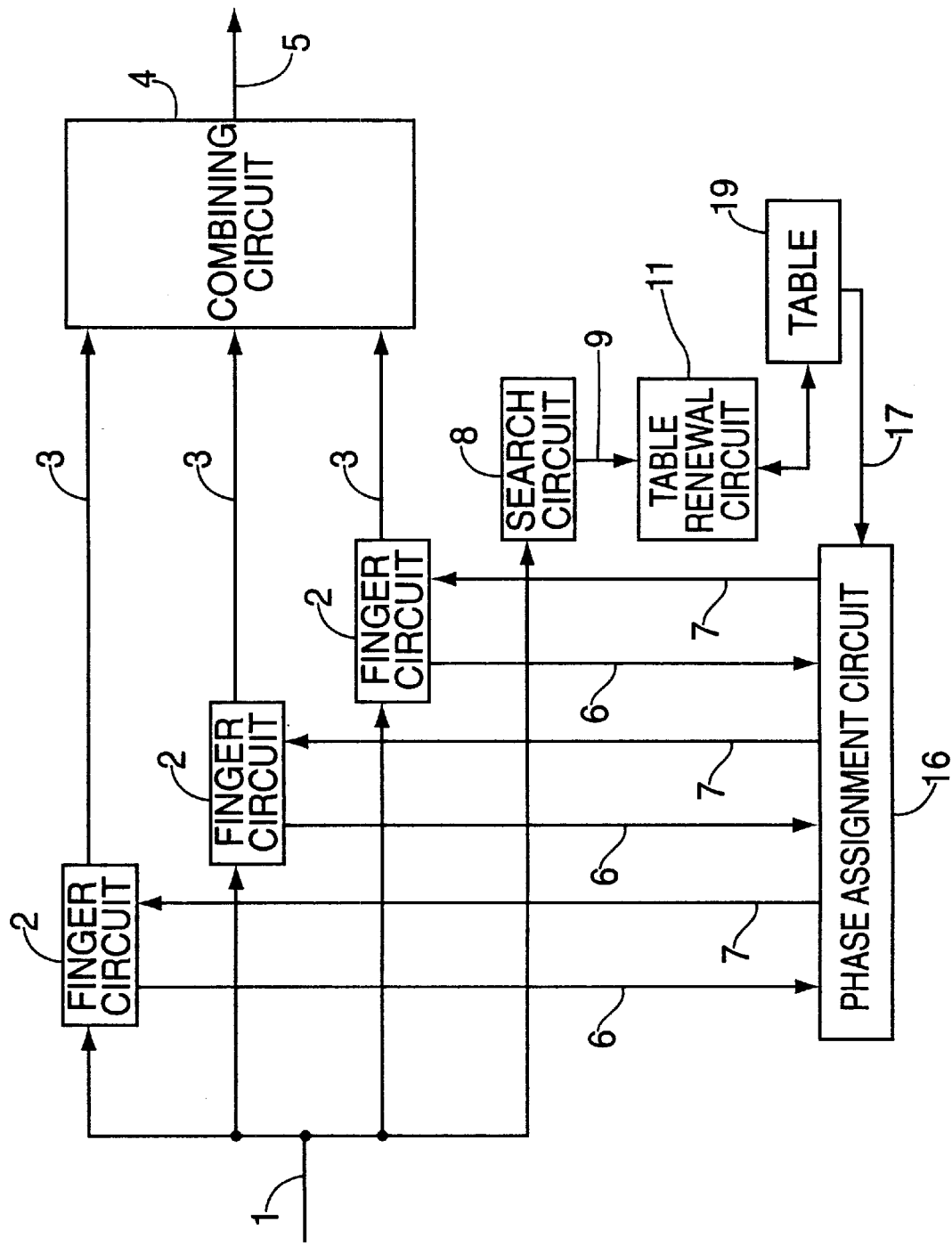
FIG. 1 is a block and schematic diagram of a prior art RAKE receiver.

A prior art system which includes a plurality of demodulation circuits for separately demodulating and combining a plurality of spread code modulated transmissions is known as a RAKE receiver. An example of the construction of a RAKE receiver is illustrated in FIG. 1. The prior art RAKE receiver includes a plurality of demodulation circuits 2 (also referred to as finger circuits) which are each assigned to separately detect transmissions received at different reception timings, which may also be modulated according to different spread code phases. By setting the finger circuits of the RAKE type receiver to demodulate transmissions received at different spread code phases, the RAKE receiver may be used to demodulate and combine the demodulated information signal content of a plurality of concurrent transmissions from different base stations or sector transmitters which are present on the same frequency.

Figure 2:
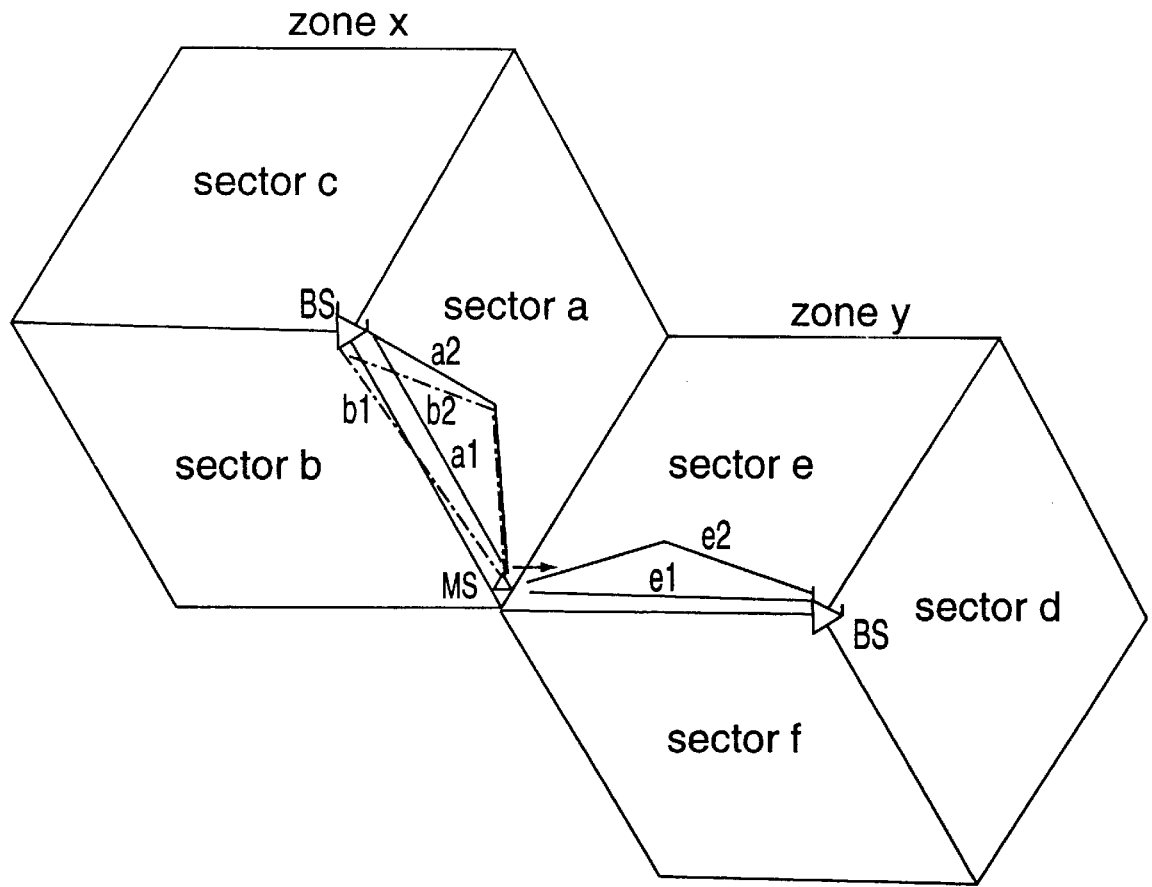
FIG. 2 illustrates the multipath component signals detected by a mobile station near the boundary between multiple sectors and zones.

The service area of a mobile communication system is generally completely divided into separate transmission zones, as illustrated in FIG. 2. In each transmission zone a central base station is provided to control the communications with mobile stations therein. Transmission zones are often further divided into transmission zone sectors which have separate sector transmitters for transmitting over directional antennas in the respective zone sectors. FIG. 2 illustrates the division of two zones x and y into sectors a, b, c and d, e, f, respectively. As shown in FIG. 2, at the center of each zone is a base station (BS) having three sector transmitters. As illustrated, each sector transmitter is used to transmit over a 120 degree arc to serve a sector of the transmission zone.

When a mobile station moves between zones or between sectors of a zone while handling a communication, a procedure must be employed to hand over the communication to the new base station or sector transmitter. In a CDMA Standard system where different base stations are permitted to transmit over the same communication frequencies, it is possible to hand over the communication between base stations without causing interruption in the communication.

Such interruption-free hand-overs are accomplished under the CDMA Standard by causing two or more transmitters, i.e., base stations or sector transmitters, to concurrently transmit signals containing the same information signal content during the hand-over process. A RAKE receiver such as described above can then be used to demodulate and combine the demodulated information signal content of the concurrently transmitted signals. This type of hand-over procedure which relies on the concurrent reception of the same information signals which have been transmitted by multiple base stations or sectors may be referred to as a soft hand-over.

FIG. 2 illustrates a condition in which a mobile station (MS) has moved near the boundaries of sectors a, b of zone x and sector e of zone y and a soft hand-over is being carried out. During the soft hand-over procedure, the sector transmitters a and b transmit modulated signals on the same frequencies which contain the same information signal content but which are modulated according to different spread code phases. Under such conditions, the RAKE receiver may be operated throughout the soft hand-over procedure to receive the communication without interruption by concurrently receiving the signals transmitted by the several proximate base stations and/or sector transmitters.

Referring to FIG. 1, in the prior art RAKE receiver, received input signal 1 is input to a plurality of spread code demodulation circuits (also called finger circuits) 2 and a search circuit 8. Each finger circuit outputs a demodulated signal 3, which is input to a combining circuit 4. The combining circuit 4 outputs a combined demodulated signal 5 which is generally a weighted sum of the demodulated signals 3.

Figure 3:
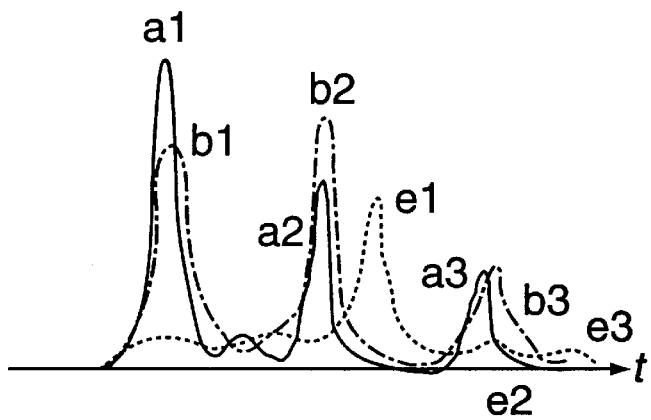
FIG. 3 illustrates the multipath signal profiles for sector transmitters of the same and different zones.

Due to the presence of multipath components of the transmission signal (for example, arising from the direct transmission path a1 and reflected transmission paths a2 and a3 of a signal transmitted from sector a), the receiver input signal 1 contains a plurality of multipath component signals which arrive according to different reception timings, such as illustrated in FIG. 3. Using the prior art RAKE receiver, the transmitted communication can be received continuously without interruption during the hand-over procedure by setting the finger circuits 2 to demodulate all or a selected subset of the same information content signals which are received along the transmission paths a1, a2, b1, b2, e1, and e2, which are shown in FIG. 2.

In order to provide renewal information permitting the finger circuits 2 to demodulate the correct signals of highest reception energy, the search circuit 8 continually measures the reception energy for each multipath component of the signal detected in receiver input signal 1 according to its spread code phase and reception timing. The search circuit 8 then outputs the reception energy, spread code phase and reception timing for each received signal component as renewal information 9 to a table renewal circuit 11.

Figure 4:
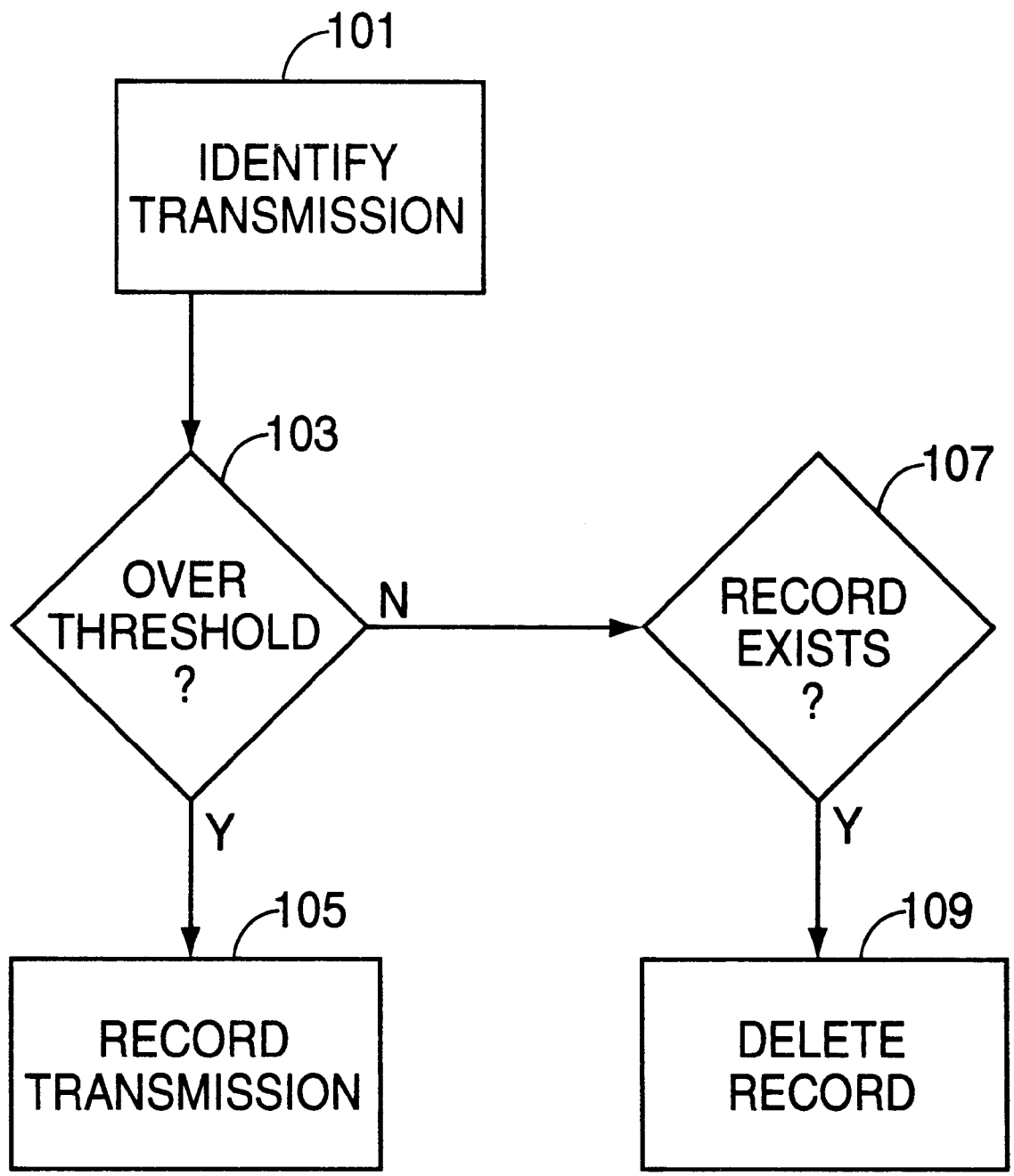
FIG. 4 illustrates the recording of transmission information by a prior art RAKE receiver.
Figure 5:
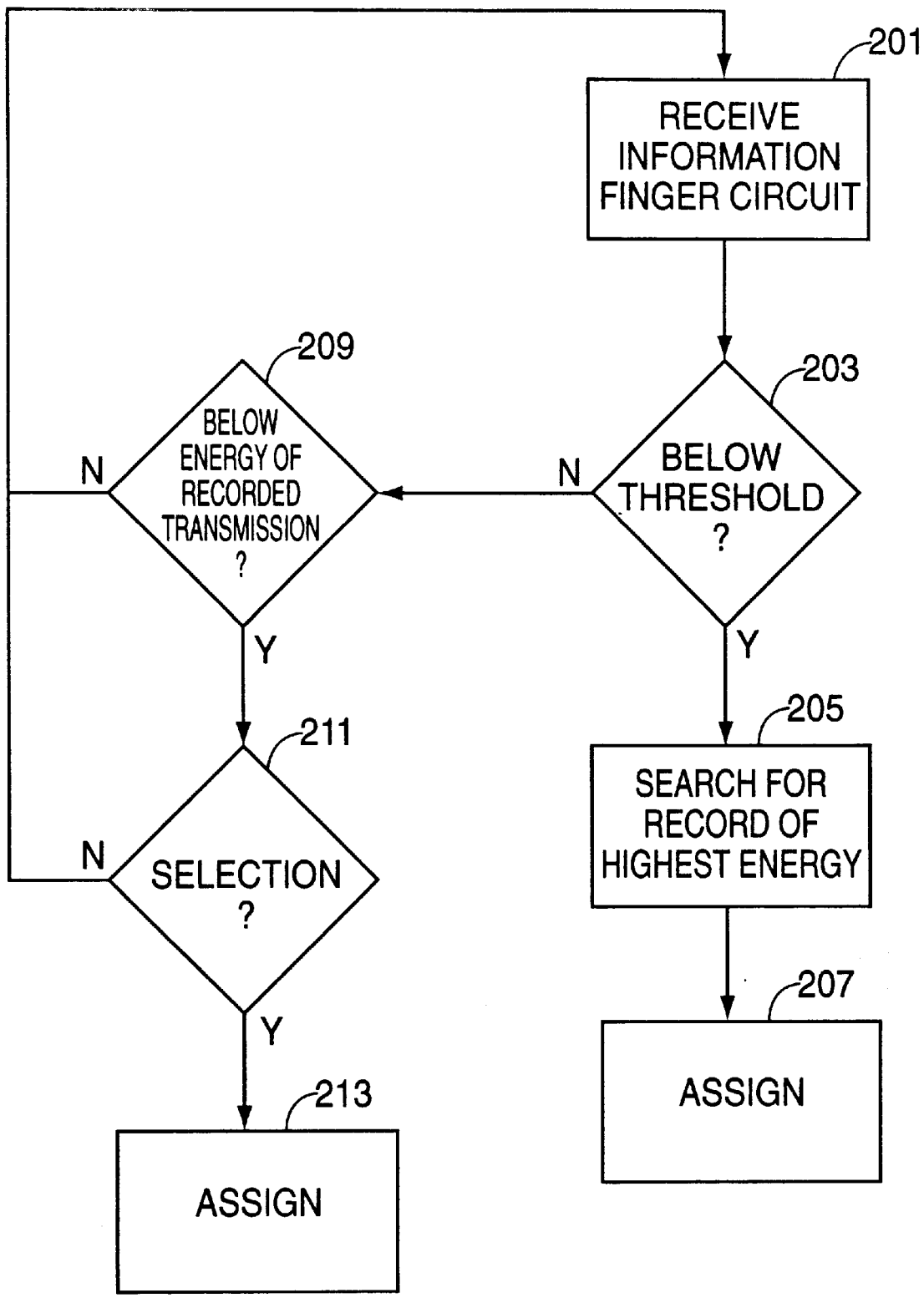
FIG. 5 illustrates the assignment of transmissions for demodulation by a prior art RAKE receiver.

More specifically, and with reference to the flowchart of operations illustrated in FIG. 4, search circuit 8 scans the detected receiver input signal 1 to locate transmissions from different base stations and sector transmitters which arrive at various reception timings because of their respective multiple transmission paths. For each detected transmission, the search circuit determines, in step 101, the signal reception energy, the corresponding reception timing and spread code phase at which the transmission is modulated. The search circuit 8 provides signals indicating the reception energy, reception timings and the spread code phase to the table renewal circuit 11. Table renewal circuit 11 receives the information from search circuit 8 and records it in a table 19 for certain detected transmissions. Table renewal circuit 11 is also used to delete the record of a transmission from table 19, when appropriate.

In operation of the prior art RAKE receivers, the table renewal circuit 11 receives the renewal information and determines, in step 103, whether the reception energy for each detected transmission exceeds a predetermined threshold. If the threshold is exceeded, the table renewal circuit 11 records, in step 105, the reception energy, the reception timing, and the spread code phase thereof in table 19. When a transmission is detected having reception energy which falls below the threshold, the table renewal circuit 11 determines, in step 107, whether table 19 contains a record for a transmission having the same reception timing and spread code phase. If such record is found in table 19, table renewal circuit 11 provides a signal causing the record to be deleted therefrom (step 109).

The finger circuits are provided with means for maintaining the correct reception timing for demodulating a selected transmission despite changes which occur in the reception timing due to the movement of the mobile station. Therefore, the reception timing of a transmission being demodulated in a finger circuit 2 at a given time may not coincide with the reception timing that is initially assigned for demodulation by the phase assignment circuit 16. Hence, each of the finger circuits 2 provides a signal 6 to indicate to phase assignment circuit 16 the reception energy, reception timing, and spread code phase being used by that finger circuit 2 to demodulate the transmissions.

The operations of the phase assignment circuit of the prior art RAKE receiver will now be described. The phase assignment circuit 16 receives inputs 6 from finger circuits 2 indicating the reception energy, reception timing and spread code phase for each of the transmissions being demodulated (step 201). Based on the information provided in inputs 6, the phase assignment circuit 16 determines (step 203) whether the reception energy of a transmission being demodulated by a finger circuit 2 lies below a predetermined threshold. In such case, the phase assignment circuit 16 receives input 17 from table 19 (step 205) indicating the reception timing and spread code phase of the recorded transmission having the highest reception energy at that time. The phase assignment circuit 16, by signal 7 (step 207) then sets the reception timing and spread code phase of the finger circuit 2 to that of the highest recorded transmission that is not already being demodulated by the other finger circuits 2.

The phase assignment circuit 16 continually receives a signal 17 from table 19 indicating the reception energy, reception timing, and spread code phase of the recorded transmission having the highest reception energy at a given point in time. Based on such signal 17 and the signals 6 from finger circuits 2, the phase assignment circuit 16 determines in step 209, for each finger circuit 2, whether the reception energy for the recorded transmission exceeds the reception energy of the transmission being demodulated by a predetermined value (step 209). In such case and in the event that selection has been made to demodulate the detected transmission (step 211), the phase assignment circuit 16 provides a signal 7 to that finger circuit 2 to begin using the reception timing and spread code phase of the higher recorded transmission (step 213).

The soft hand-over procedure as occurs in the prior art RAKE receiver will now be described, with reference to the above description of RAKE receiver operations. The soft hand-over procedure begins by the mobile station moving in the vicinity of another transmission zone or sector at which location the mobile station begins detecting signals from a different base station or sector having sufficient reception energy to permit hand-over of the communication. For this operation, search circuit 8 of the RAKE receiver in the mobile station identifies a transmission which is modulated at a different spread code phase and determines the reception energy and reception timing thereof. When the mobile station determines that the reception energy of the transmission exceeds a predetermined threshold, the mobile station transmits a signal to the original base station or sector transmitter to initiate the hand-over. The new base station or sector then begins transmitting the communication concurrently with transmission of the communication by the original base station or sector transmitter.

The phase assignment circuit 16 then proceeds in assigning the new spread code phase and reception timings to the finger circuits in accordance with the operating principles described above. As a result, when the search circuit 8 of the mobile station detects that the reception energy for transmissions modulated at the spread code phase of a base station which the mobile station is moving away from continues to decrease and the reception energy of transmissions received from a new base station or sector transmitter exceed those of the original base station by a predetermined value, the hand-over proceeds with the phase assignment circuit assigning the spread code phase for the new base station or sector and the reception timings thereof to the finger circuits 2.

However, when the mobile station begins moving in a direction back toward the original base station before the hand-over procedure is completed, the search circuit 8 begins to receive decreased reception energy from the base station toward which the mobile station first moved. In accordance with the above operating principles, the phase assignment circuit 16 assigns a spread code phase and reception timing to each finger circuit 2. Eventually, the assignment of spread code phases and reception timings change over from a mixed assignment between different base stations and sector transmitters back again to a single sector assignment of the original base station. Throughout the entire hand-over procedure the communication is maintained without interruption.

However, certain undesirable results are obtained in the prior art because the prior art RAKE receiver makes assignments of the spread code phases and reception timings to be used by the finger circuits 2 solely on the basis of detected reception energy. When the prior art RAKE receiver handles a hand-over taking place simultaneously between different sectors of the same base station and between different base stations, occasions exist in which the finger circuits are assigned to demodulate the transmissions of only two sectors of the same base station without demodulating the transmissions of the new base station. This situation is to be avoided.

FIG. 3 is a graph illustrating the reception energy versus reception timing for transmissions received from sector transmitters a, b and e. As indicated by FIG. 3, multipath components of transmissions from sector transmitter a are received at different reception energy levels corresponding to different reception timings for the multipath components a1, a2, and a3. The RAKE receiver of the mobile station can distinguish these multipath components transmitted by sector a from the multipath components transmitted by sector b by the spread code phase at which they are modulated. In like manner as described above for sector a, multipath components of a transmission from sector transmitter b are received at different reception energy levels corresponding to different reception timings for the transmission paths b1, b2, and b3. The profile of the reception energy levels and reception timings for the multipath components of transmissions received from sector a and from sector b appear similar because the antennas for sector a and sector b both lie at the same location, that is, at the location of the same base station.

However, when a mobile station approaches the perimeter of a transmission zone, the reception from the base station of that zone is at its weakest. Movement of the mobile station may cause further weakening of the received signal due to fading caused by shadowing (i.e., signal blockage caused by buildings, for example) and/or destructive interference, i.e., Rayleigh fading, between reflections of the transmitted signal which arrive along different transmission paths. Since the sector transmitters of the same base station lie at the same location, the transmissions thereof will be subject to simultaneous fading which causes the reception quality in the mobile station to fall below acceptable limits.

Thus, it would be desirable, when a mobile station simultaneously approaches the boundary between two sectors of a zone and that of another zone, to avoid assigning the spread code phases and reception timings for demodulating only the transmissions from two sectors of the same zone.

A new system and method is disclosed herein in which the assignment of spread code phases and reception timings can be performed so as to prefer the demodulation of transmissions received from both the new base station and one or more sectors of the original base station in preference over an assignment which results in the demodulation of transmissions received from only the sector transmitters of the same base station.

Accordingly, it is an object of the present invention to provide a receiving system and method which provides a judgment, when multiple transmissions are received which have sufficient energy to be assigned for demodulation, of whether the transmissions have originated from sector transmitters of the same base station or have originated from different base stations.

It is a further object of the present invention to provide a receiving system and method which, after a determination is made that transmissions of sufficient energy are being detected from sector transmitters of the same base station and from another base station, that the transmission of the different base station can be assigned for demodulation in preference over a transmission received from a sector transmitter of the same base station.

Still another object of the present invention is to provide a receiving system and method which, after a determination is made that transmissions of sufficient reception energy are being detected which have similar reception timings, that transmissions of sufficient reception energy can be selected for demodulation which have different reception timings in preference over transmissions having similar reception timings.

SUMMARY OF THE INVENTION

These and other objects are provided by the CDMA system mobile communication receiver of the present invention. The CDMA system mobile communication receiver of the present invention performs, in addition to the operations performed by the prior art RAKE spread spectrum receiver (as discussed above), a determination of whether two or more detected transmissions which have the same reception timings are modulated according to different spread code phases. Based on the result of this determination, the CDMA receiver of the present invention selects transmissions for demodulation which originate from different base stations in preference over the transmissions which originate from the sector transmitters of the same base station.

The CDMA receiver of the present invention accomplishes the foregoing objects by maintaining separate tables for use in demodulating the transmissions which appear likely to be transmitted by different sector transmitters of the same base station. Using the separate tables, the receiver is able to select for demodulation transmissions which are transmitted from different base stations in preference over those transmitted by sector transmitters of the same base station.

Specifically, a priority one table is used to maintain updated information for demodulating transmissions which have the highest reception energy for each particular reception timing. A priority two table is used to maintain updated information in demodulating other transmissions which are detected at the same reception timing as those recorded in the priority one table. The selection of phase and reception timing assignments for demodulating particular transmissions by the demodulation circuits is made from the transmission information recorded in the priority one table in preference over the transmission information recorded in the priority two table. In this manner, the transmissions transmitted from different base stations are selected for demodulation in preference over the transmissions transmitted from the same base station. As a result, when a mobile station operates in a location which is both near the boundary between different base station zones and near the boundary between different sectors of a single zone, the combined reception signal, having originated from at least two base station transmitters, is less subject to sudden decreases in signal power such as caused by shadowing and Rayleigh fading.

DETAILED DESCRIPTION OF THE PREFERRED EMBODIMENTS

Figure 6:
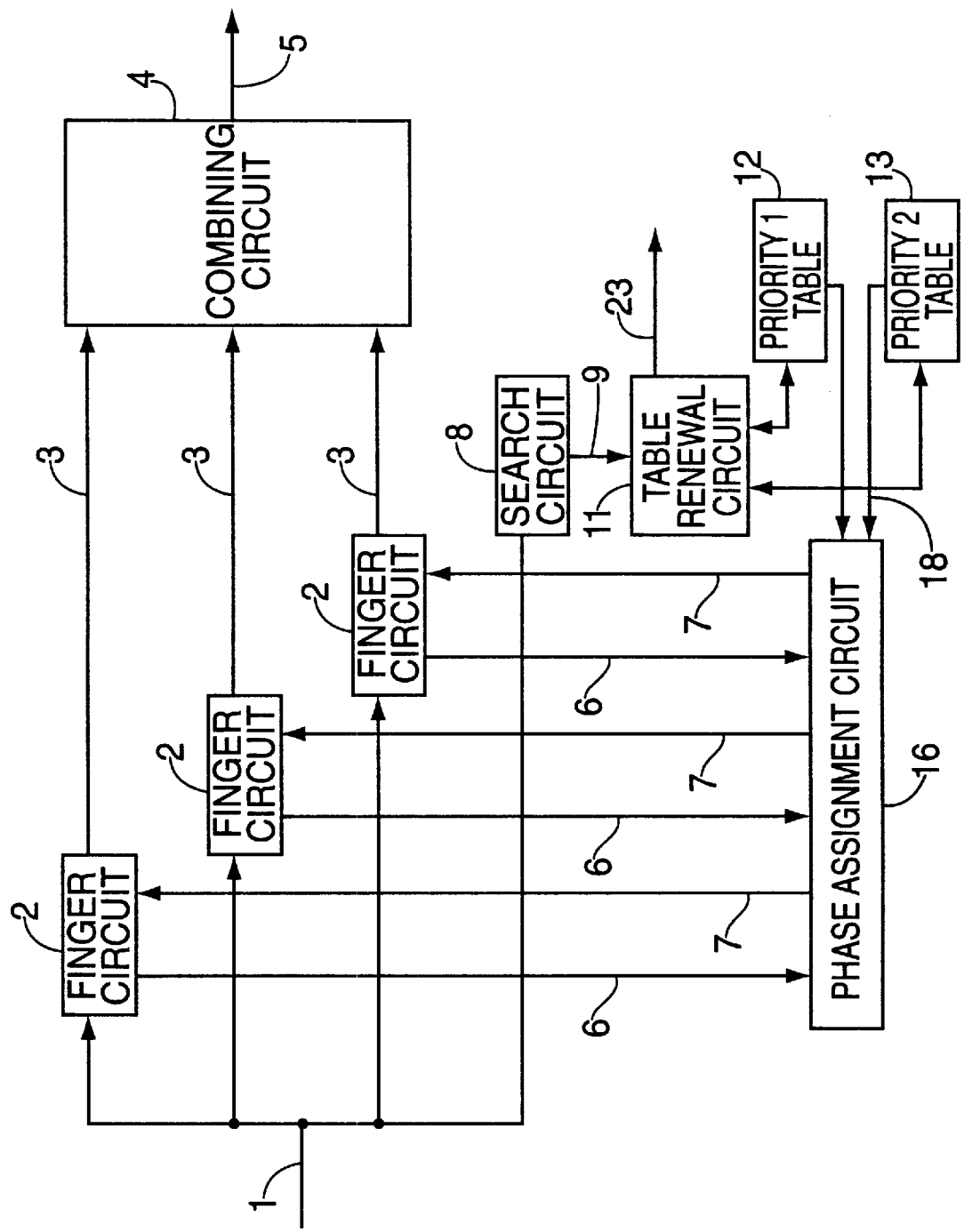
FIG. 6 is a block and schematic diagram of a receiver according to the present invention.

FIG. 6 is a block and schematic diagram illustrating a mobile communication receiver constructed in accordance with the present invention. As in the prior art RAKE receiver of FIG. 1, a receiver input signal 1 is input to a plurality of spread code demodulation circuits (also called finger circuits) 2 and a search circuit 8. Each finger circuit outputs a demodulated signal 3, which is input to a combining circuit 4. The combining circuit 4 outputs a combined demodulated signal 5 which is a weighted sum of the demodulated signals 3. A search circuit 8 is provided to continually measure the reception energy of each transmission detected in receiver input signal 1 according to its spread code phase and reception timing. The search circuit 8 outputs the reception energy, spread code phase and reception timing of each transmission as renewal information 9 to the table renewal circuit 11.

The mobile communication receiver constructed according to the present invention includes a "priority one" table 12 and a "priority two" table 13 which are interconnected to the table renewal circuit 11 and the phase assignment circuit 16. The priority one table 12 and the priority two table 13 are used to record the reception energy, reception timing, and spread code phase for transmissions which are determined by the table renewal circuit 11 to exceed a predetermined threshold in reception energy. The phase assignment circuit 16 selects transmissions for assignment to the finger circuits 2 using the information recorded for a transmission in the priority one and priority two tables 12, 13.

Figure 7:
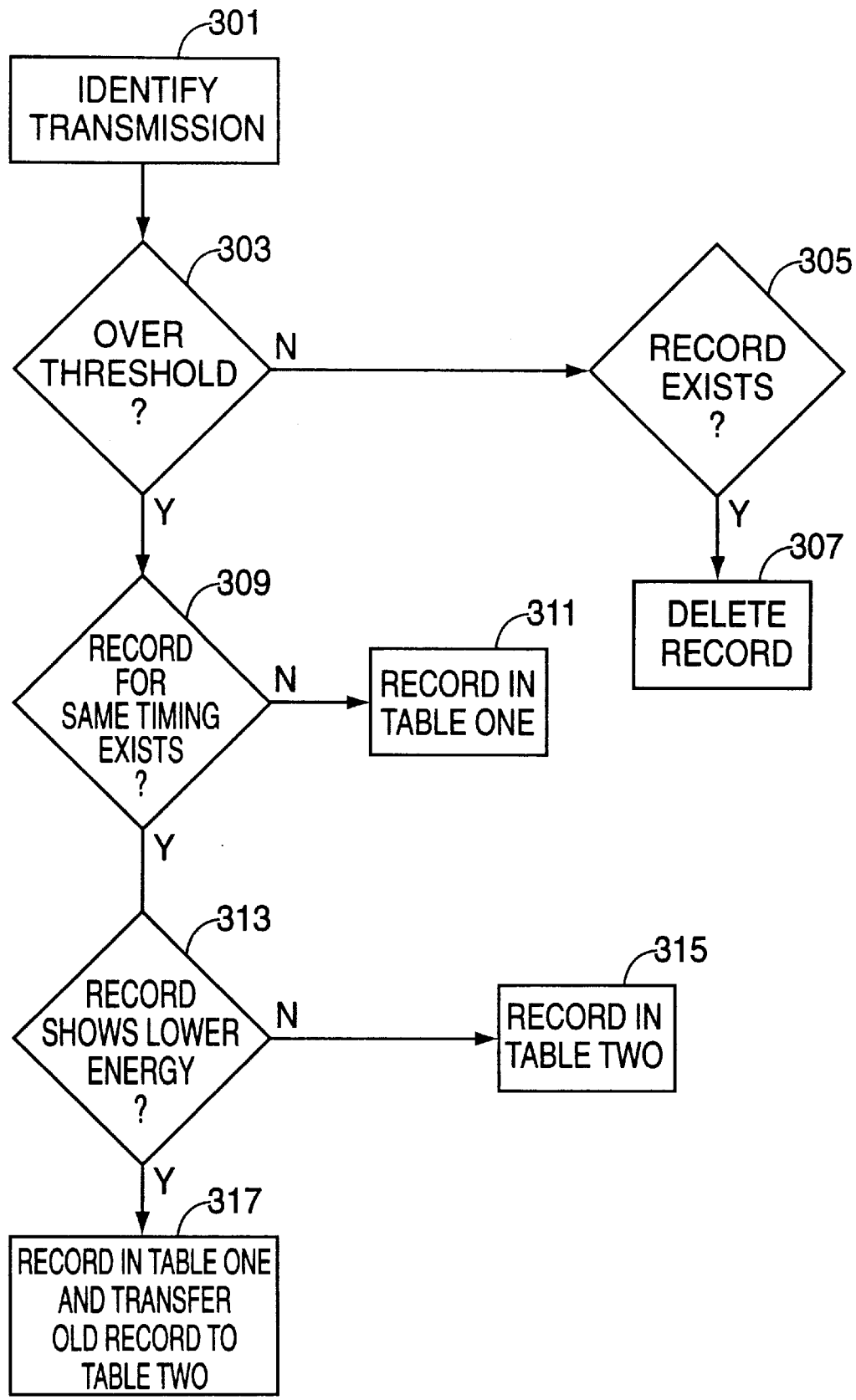
FIG. 7 illustrates the recording of transmission information by the receiver constructed according to a first embodiment of the present invention.

The operations of the mobile communication receiver shown in FIG. 6 will now be described, with reference to the flow charts of FIGS. 7 and 8. As indicated in FIG. 7, the search circuit continually scans to detect transmissions and determines, in step 301, the reception energy, reception timing, and the spread code phase for each detected transmission. The search circuit provides this information to table renewal circuit 11.

Using the information provided by search circuit 8, table renewal circuit 11 compares the reception energy of the detected transmission to a predetermined threshold in step 303. If the reception energy is below the threshold, table renewal circuit 11 searches, in step 305, the priority one and priority two tables 12 and 13 to determine if a transmission is recorded in either table which has the same reception timing and is modulated according to the same spread code phase. If so, table renewal circuit 11 causes the record for the transmission to be deleted from that table (step 307).

However, if the reception energy for the detected transmission exceeds the predetermined threshold, the table renewal circuit 11 searches the priority one table 12 to determine if that table contains a record for a transmission detected at the same reception timing which is modulated at a different spread code phase (step 309). If no such record is found in the priority one table 12, the table renewal circuit 11 causes a record of the detected transmission to be made therein (step 311).

If the reception energy for the detected transmission exceeds the predetermined threshold, the table renewal circuit 11 determines if the priority one table 12 contains a record for a transmission detected at the same reception timing but which is modulated at a different same spread code phase. If such is the case, the table renewal circuit 11 compares (in step 313) the reception energy of the transmission recorded in the priority one table 12 with that of the transmission detected by search circuit 8. If the recorded transmission has the higher reception energy, the record is maintained in the priority one table 12. The table renewal circuit 11 then causes the detected transmission to be recorded in the priority two table 13 (step 315). However, if the detected transmission has a higher reception energy than the transmission recorded in the priority one table 12, the detected transmission is recorded in the priority one table 12 and the record for the transmission that was found in the priority one table 12 is transferred to the priority two table 13 (step 317). In accordance with this selection and prioritizing scheme, the priority one table will be dynamically updated to always contain information as to the highest energy transmissions at different reception timings. If a second transmission of lower energy having a different spread code phase is detected at the same reception timing, it will be placed in the priority two table. In this way, the priority one and priority two tables 12, 13 separately maintain information for demodulating transmissions which appear to originate from different sector transmitters of the same base station, since transmissions which are received at the same reception timing but at different spread code phases are more likely to be from sector transmitters of the same base station.

Figure 8:
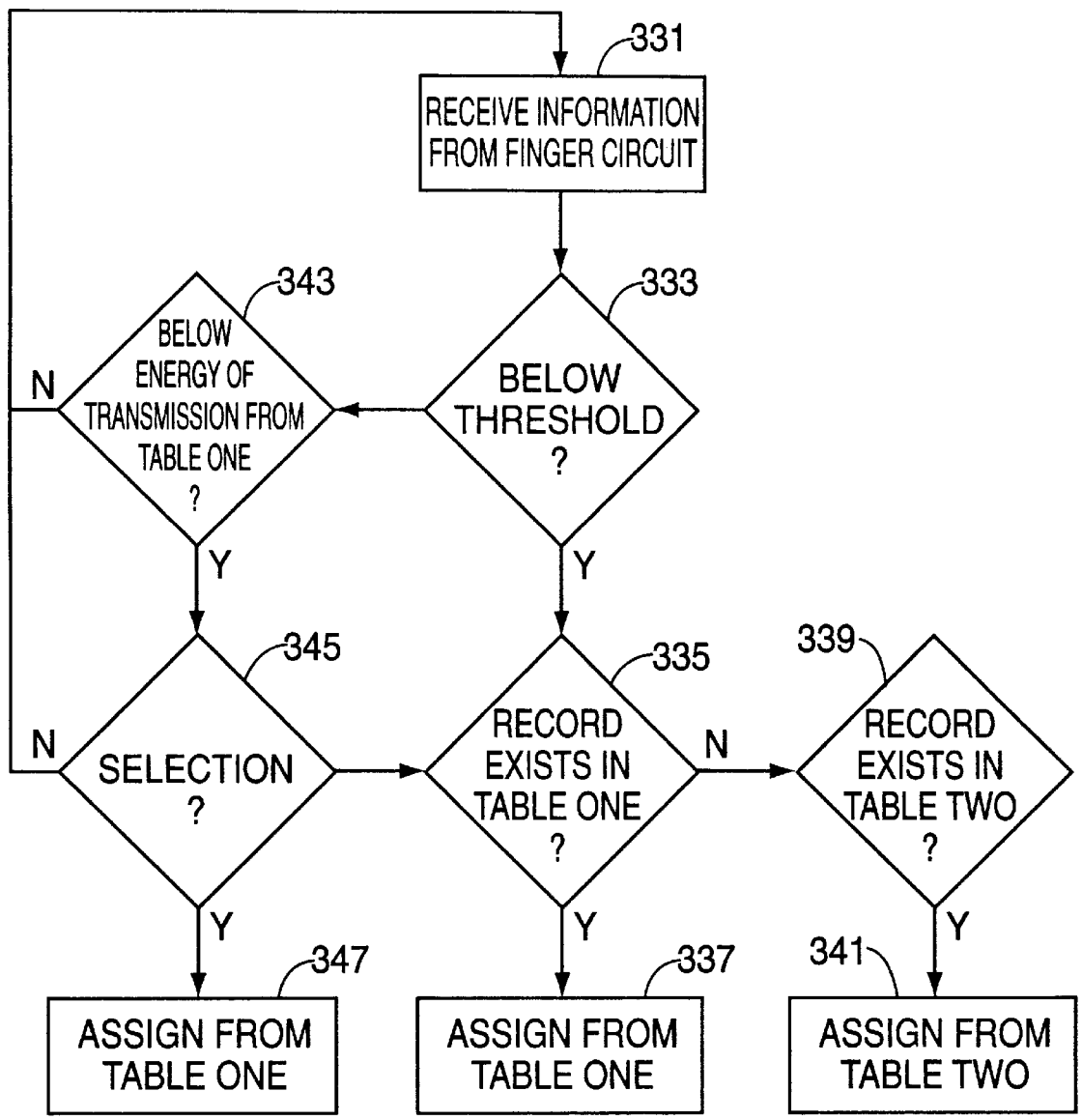
FIG. 8 illustrates the assignment of transmissions for demodulation by the receiver constructed according to a first embodiment of the present invention.

The phase assignment operation according to the present invention proceeds in a manner illustrated by FIG. 8. The phase assignment circuit receives inputs 6 from the finger circuits which contain information as to the reception energy, reception timing, and the spread code phase settings currently being used to demodulate transmissions (Step 331). The phase assignment circuit 16 determines if the reception energy for any of the transmissions being demodulated lies below a predetermined minimum threshold (step 333). If such is the case, the phase assignment circuit 16 consults the priority one table 12 to determine if any record is found therein for a transmission at a spread code phase which can be demodulated (step 335). If any such record is found, and the transmission is not already being demodulated by a finger circuit 2, the phase assignment circuit 16 assigns, in step 337, the reception timing and spread code phase of the transmission recorded in the priority one table 12 to the finger circuit 2 that was demodulating the below threshold reception energy. This operation, by virtue of the manner by which the priority one table entries are maintained, results in an assignment for demodulation of transmissions which are not likely to originate from two sectors of the same zone.

However, it sometimes occurs that the priority one table 12 will not contain a record for a transmission which can be demodulated. In such case, the phase assignment circuit will search the priority two table 13 to determine if a record is found therein for a transmission which can be demodulated (step 339). If such record is found, and the transmission is not already being demodulated by a finger circuit, the phase assignment circuit 16 assigns, in step 341, the reception timing and spread code phase of the transmission recorded in priority two table 13 to the finger circuit 2 that detected the below threshold reception energy.

In this manner, the phase assignment circuit preferentially selects transmissions for demodulation from the priority one table 12 which contains records for transmissions which are less likely to originate from the sector transmitters of the same base station. As a result, the finger circuits can be assigned to demodulate transmissions from different base stations in preference over transmissions which originate from two or more sector transmitters of the same base station.

As in the prior art RAKE receiver, the phase assignment circuit monitors the reception energy detected by the finger circuits 2. Even when the reception energy detected by a finger circuit exceeds the predetermined minimum threshold level, the phase assignment circuit 16 consults the priority one table to determine, in step 343, if any transmission is recorded therein which exceeds the reception energy level of a particular finger circuit 2 by a predetermined amount. If such record is found in the priority one table 12, and a selection has been made to demodulate that transmission (step 345), the phase assignment circuit provides a signal 7 containing the reception timing and spread code phase to cause the particular finger circuit to begin demodulating that transmission (step 347).

FIG. 6 shows the table renewal circuit 11 as further providing a signal 23. Signal 23 is used to indicate when a transmission has been detected for which a record exists in the priority one or priority two tables 12, 13 which has the same reception timing but a different spread code phase. Signal 23 may be used by other circuitry in the mobile station or cellular system for monitoring or reception control purposes.

In accordance with the above-described operations, when a mobile station moves into the vicinity of the boundary between two sectors and a different zone, a soft hand-over procedure will be carried out with the effect that the transmissions selected for demodulation by the finger circuits will be less likely to originate from the same zone than as occurs in the prior art RAKE type receiver. The determination in the present invention of whether transmissions originate from the same or different base stations, and the recording of those transmissions in separate tables according to such determination, provides an improvement over the prior art RAKE receiver which selects transmissions for demodulation without making such distinctions.

While the invention has been described in detail herein in accordance with certain preferred embodiments thereof, many modifications and changes therein may be effected by those skilled in the art Accordingly, it is intended that the claims which follow cover all such modifications and changes that fall within the true spirit and scope of this invention.

What is claimed is:

1. A system for concurrently demodulating selected ones of a plurality of transmissions to produce a demodulated signal, said system having search means for identifying transmissions based upon their respective reception energies and reception timings, said system further comprising:

selecting means for selecting from said identified transmissions a first group of transmissions such that each transmission in said first group always has the highest reception energy at its corresponding reception timing and for selecting from said identified transmissions a second group of transmissions having lower reception energies at one or more reception timings of said first group of transmissions; and assigning means for preferentially assigning from said first group said plurality of transmissions to be concurrently demodulated.

2. The system of claim 1 wherein said selecting means includes means for storing reception timings and reception energies of said first group of transmissions.

3. The system of claim 1 wherein said assigning means preferentially assigns said selected transmissions from said first group in order beginning with the highest reception energy.

4. The system of claim 1 wherein said assigning means preferentially assigns said transmissions to be concurrently demodulated from said first group over those of said second group.

5. The system of claim 4 wherein said selecting means includes a first table for storing information regarding said first group of transmissions and a second table for storing information regarding said second group of transmissions.

6. The system of claim 5 wherein said first table stores reception timings and reception energies for said first group of transmissions and said second table stores reception timings and reception energies for said second group of transmissions.

7. A communications receiver having a plurality of demodulators for concurrently demodulating selected ones of a plurality of transmissions encoded with a spread code at one or more phases thereof to produce a demodulated signal, said communications receiver having search means for identifying transmissions based upon their respective reception energies, reception timings, and spread code phases, said communications receiver further comprising:

selecting means for selecting from said identified transmissions a first group of transmissions such that each transmission in said first group always has the highest reception energy at its corresponding reception timing and for selecting from said identified transmissions a second group of transmissions having lower reception energies at one or more reception timings of said first group of transmissions; and assigning means for preferentially assigning to said plurality of demodulators reception timings and corresponding spread code phases of said first group of transmissions.

8. The system of claim 7 wherein said selecting means includes a table for storing said reception timings, said spread code phases, and said reception energies of said first group of transmissions.

9. The system of claim 7 wherein said assigning means preferentially assigns said plurality of transmissions in order beginning with the highest reception energy.

10. The system of claim 7 wherein said assigning means preferentially assigns said reception timings and corresponding spread code phases from said first group of transmissions to be concurrently demodulated over those of said second group.

11. The system of claim 10 wherein said selecting means includes a first table for storing reception energies, reception timings, and corresponding spread code phases for said first group of transmissions, and a second table for storing reception energies, reception timings, and corresponding spread code phases for said second group of transmissions.

12. A method for concurrently demodulating selected ones of a plurality of transmissions identified by their respective reception energies and reception timings to produce a demodulated signal, comprising the steps of:

selecting from said identified transmissions a first group of transmissions such that each transmission in said first group always has the highest reception energy at its corresponding reception timing;

selecting from said identified transmissions a second group of transmissions having lower reception energies at one or more reception timings of said first group of transmissions; and preferentially assigning from said first group said plurality of transmissions to be concurrently demodulated.

13. The method of claim 12 further including the step of storing reception timings and reception energies for said first group of transmissions.

14. The method of claim 13 wherein said preferential assigning is performed in order beginning with a transmission of said first group having the highest reception energy.

15. The method of claim 12 wherein said assigning is performed to preferentially assign for concurrent demodulation transmissions from said first group over those of said second group.

16. The method of claim 12 wherein said selecting includes storing reception timings and reception energies of said first group of transmissions and said further selecting includes storing reception timings and reception energies of said second group of transmissions.

17. A method of demodulating a spread spectrum communication by concurrently demodulating selected ones of a plurality of transmissions identified by their respective reception energies, reception timings and spread codes phases, comprising the steps of:

selecting from said identified transmissions a first group of transmissions such that each transmission in said first group always has the highest reception energy at its corresponding reception timing;

selecting from said identified transmissions a second group of transmissions having lower reception energies at one or more reception timings of said first group of transmissions; and assigning transmissions for concurrent demodulation wherein said assigning is performed to preferentially assign transmissions for concurrent demodulation having reception timings and corresponding spread code phases of said first group over those of said second group.

18. The method of claim 17 wherein said selecting includes the step of storing reception timings, spread code phases, and reception energies for said first group of transmissions.

19. The method of claim 18 wherein said assigning is performed in order beginning with a transmission of said first group having the highest reception energy.

20. The method of claim 17 wherein said selecting includes storing reception energies, reception timings, and corresponding spread code phases of said first group of transmissions and said further selecting includes storing reception energies, reception timings, and corresponding spread code phases of said second group of transmissions.

* * * * *